US011884057B2

(12) United States Patent
De Rauw

(10) Patent No.: US 11,884,057 B2
(45) Date of Patent: Jan. 30, 2024

(54) METHOD AND SYSTEM FOR PROCESSING A RASTER IMAGE FILE

(71) Applicant: XEIKON PREPRESS N.V., Ypres (BE)

(72) Inventor: Dirk Ludo Julien De Rauw, Ninove (BE)

(73) Assignee: XSYS PREPRESS N.V., Ypres (BE)

( * ) Notice: Subject to any disclaimer, the term of this patent is extended or adjusted under 35 U.S.C. 154(b) by 57 days.

(21) Appl. No.: 17/780,609

(22) PCT Filed: Dec. 3, 2020

(86) PCT No.: PCT/EP2020/084454
§ 371 (c)(1),
(2) Date: May 27, 2022

(87) PCT Pub. No.: WO2021/110831
PCT Pub. Date: Jun. 10, 2021

(65) Prior Publication Data
US 2023/0330984 A1    Oct. 19, 2023

(30) Foreign Application Priority Data
Dec. 3, 2019   (NL) ...................................... 2024368

(51) Int. Cl.
*B41F 5/24*  (2006.01)
*G06K 15/02*  (2006.01)
(52) U.S. Cl.
CPC ............ *B41F 5/24* (2013.01); *G06K 15/1822* (2013.01); *G06K 15/1881* (2013.01)

(58) Field of Classification Search
CPC .... B41F 5/24; G06K 15/1822; G06K 15/1881
See application file for complete search history.

(56) References Cited

U.S. PATENT DOCUMENTS

| 2013/0019767 A1 | 1/2013 | Sanger |
| 2013/0075376 A1* | 3/2013 | Shigeta .................... B41C 1/05 219/121.68 |

FOREIGN PATENT DOCUMENTS

| EP | 0910206 A1 | 4/1999 |
| EP | 3290220 A1 | 3/2018 |

OTHER PUBLICATIONS

International Search Report and Written Opinion for PCT/EP2020/084454, dated Feb. 24, 2021 (11 pages).
International Preliminary Report on Patentability, dated Dec. 6, 2021, for PCT/EP2020/084454 (17 pages).

* cited by examiner

*Primary Examiner* — Christopher Wait
(74) *Attorney, Agent, or Firm* — KDW Firm PLLC

(57) ABSTRACT

A method for processing a raster image file includes: receiving a raster image file comprising image data for a plurality of pixels, analyzing the image data of the raster image file, determining control data, and optionally at least one new raster image file, based on the analyzed image data, said control data being data for controlling settings of an imaging device so as to change the physical properties of generated imaged features corresponding with one or more of the plurality of pixels, and outputting the raster image file and/or the new raster image file, with the control data to an imaging device for imaging a relief precursor.

21 Claims, 14 Drawing Sheets

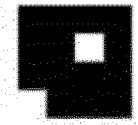
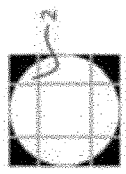
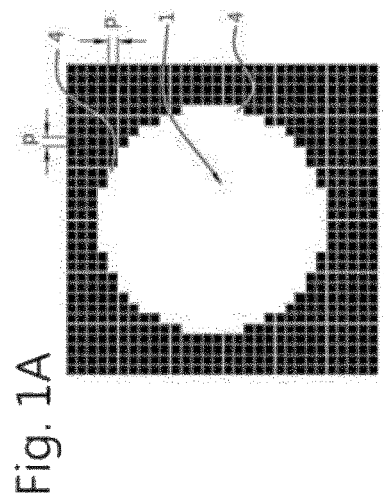
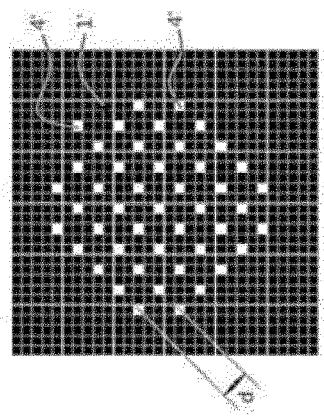
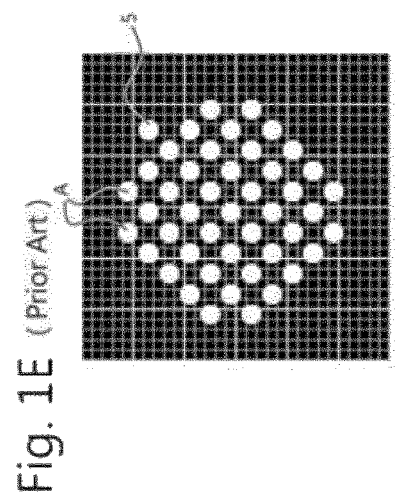
Fig. 1A
Fig. 1B (Prior Art)
Fig. 1C (Prior Art)
Fig. 1D
Fig. 1E (Prior Art)

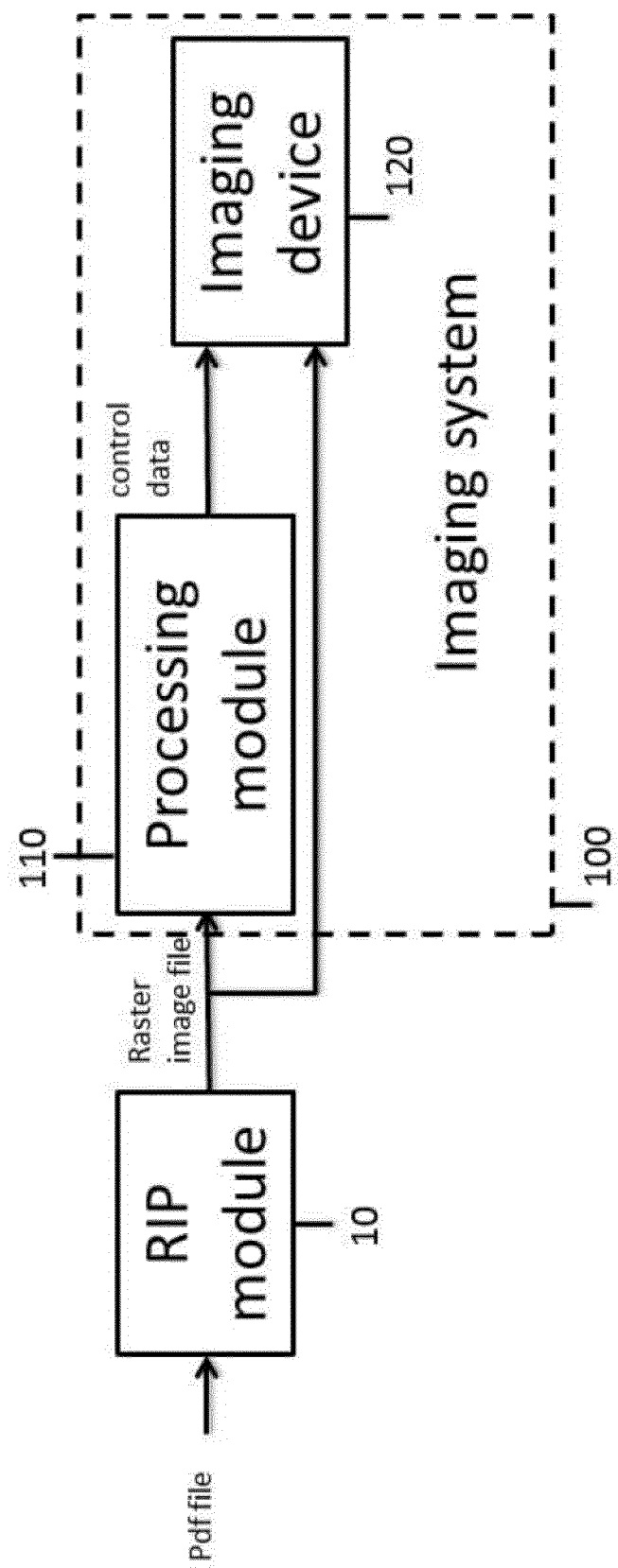

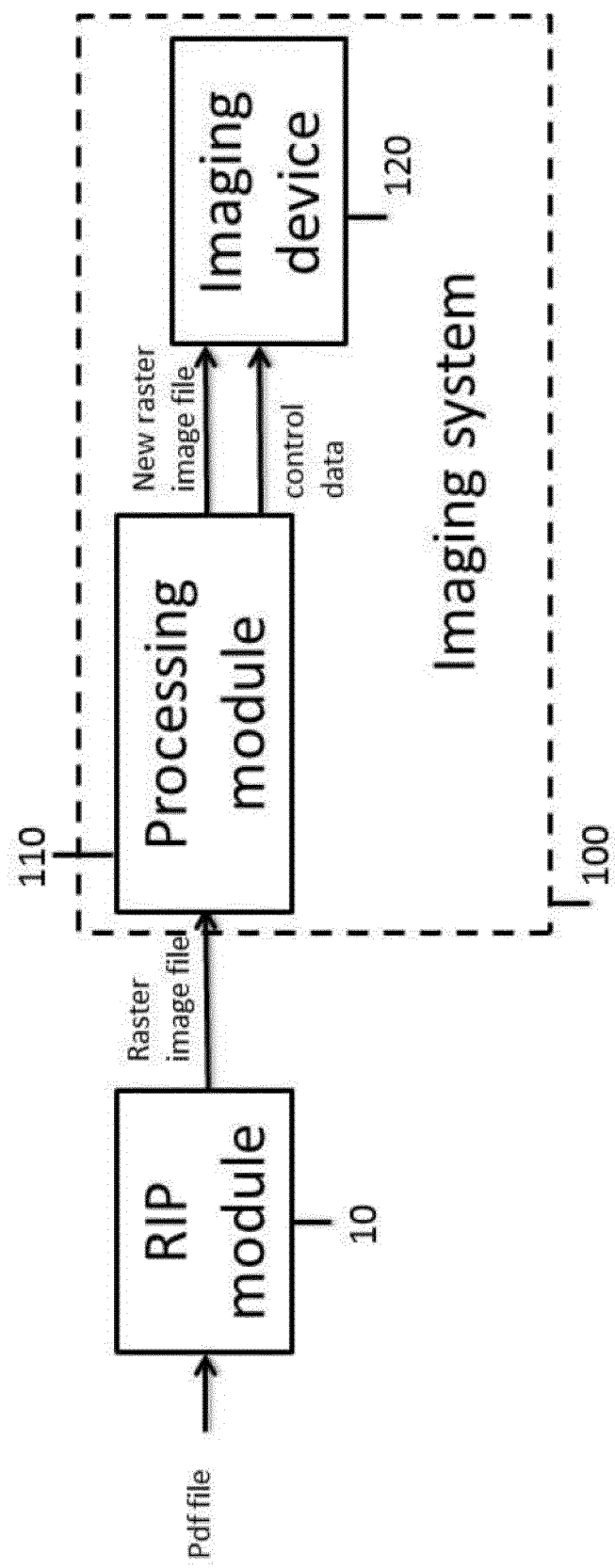

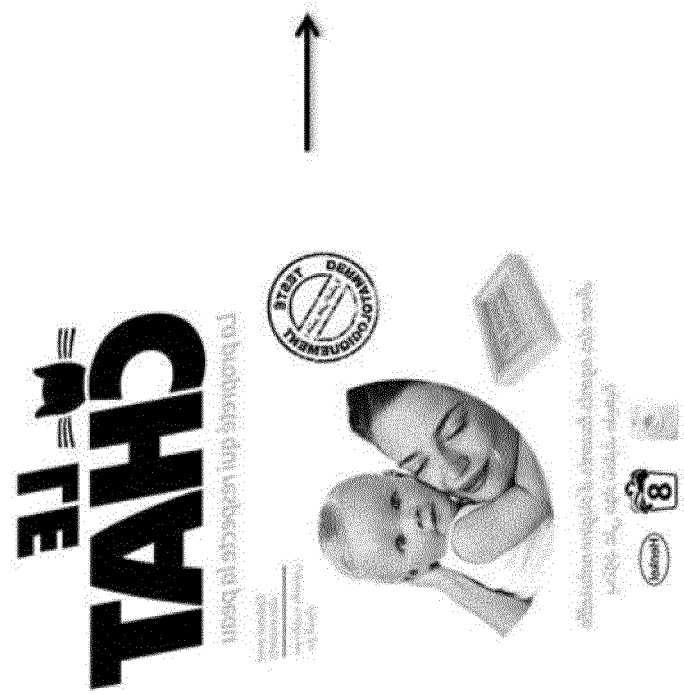
Fig. 10A

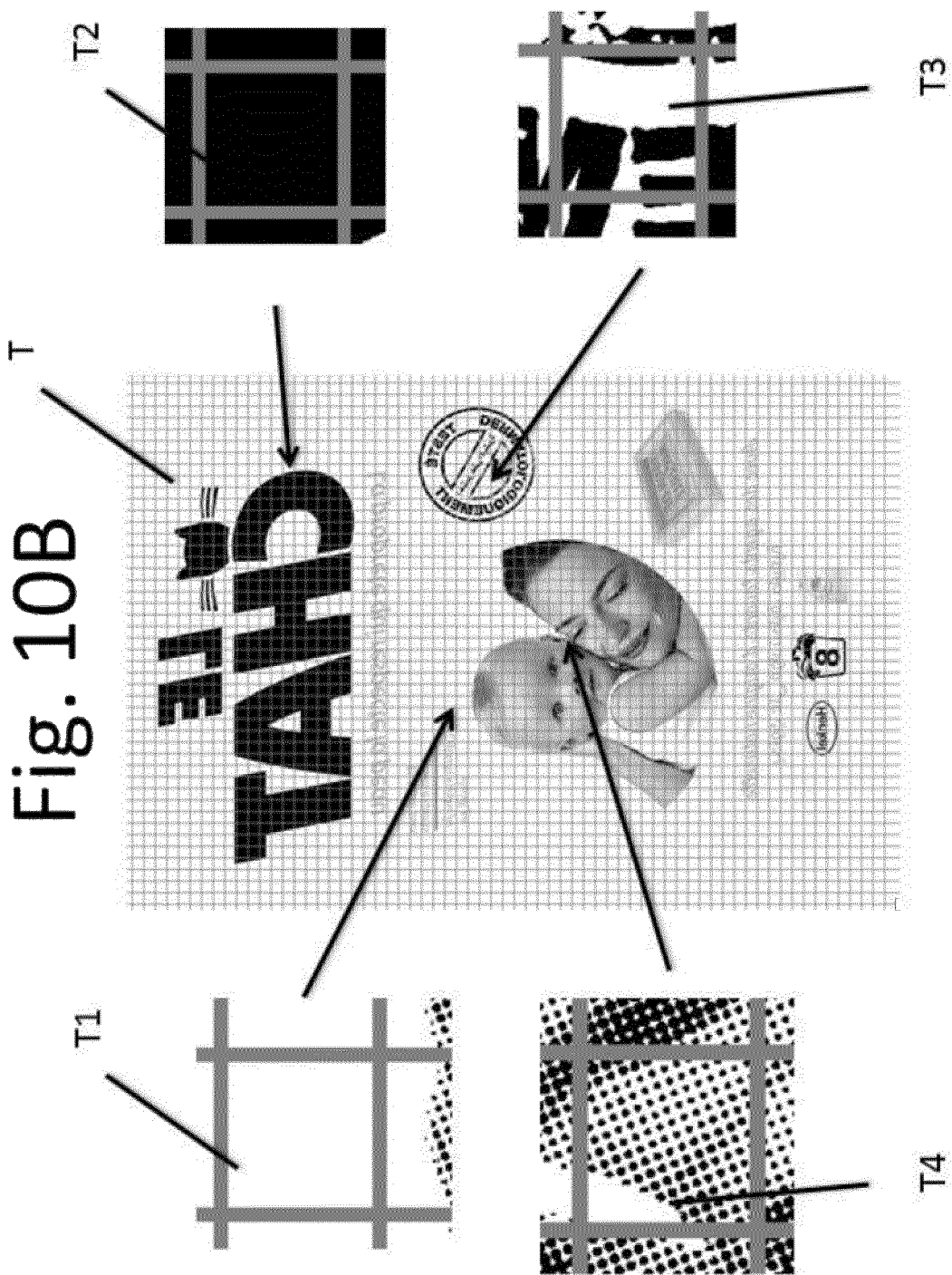

Fig. 10C
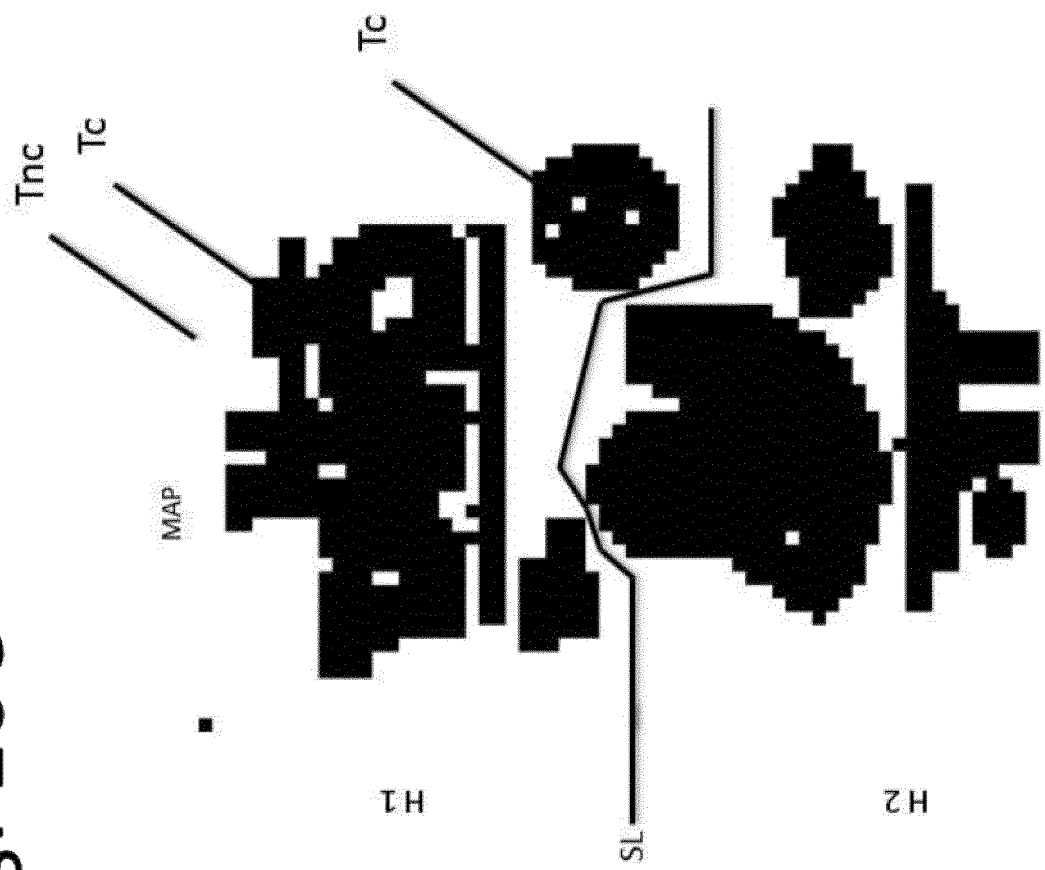
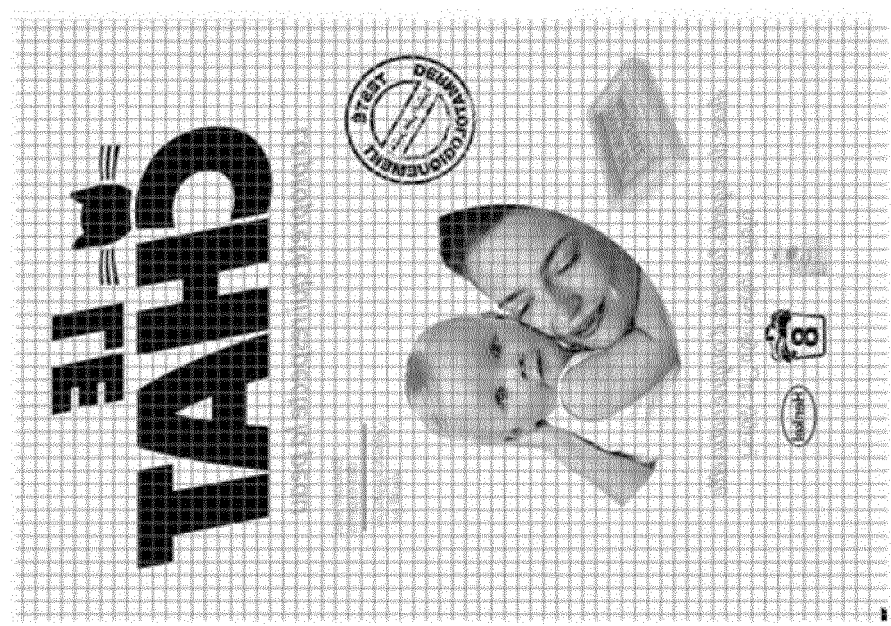

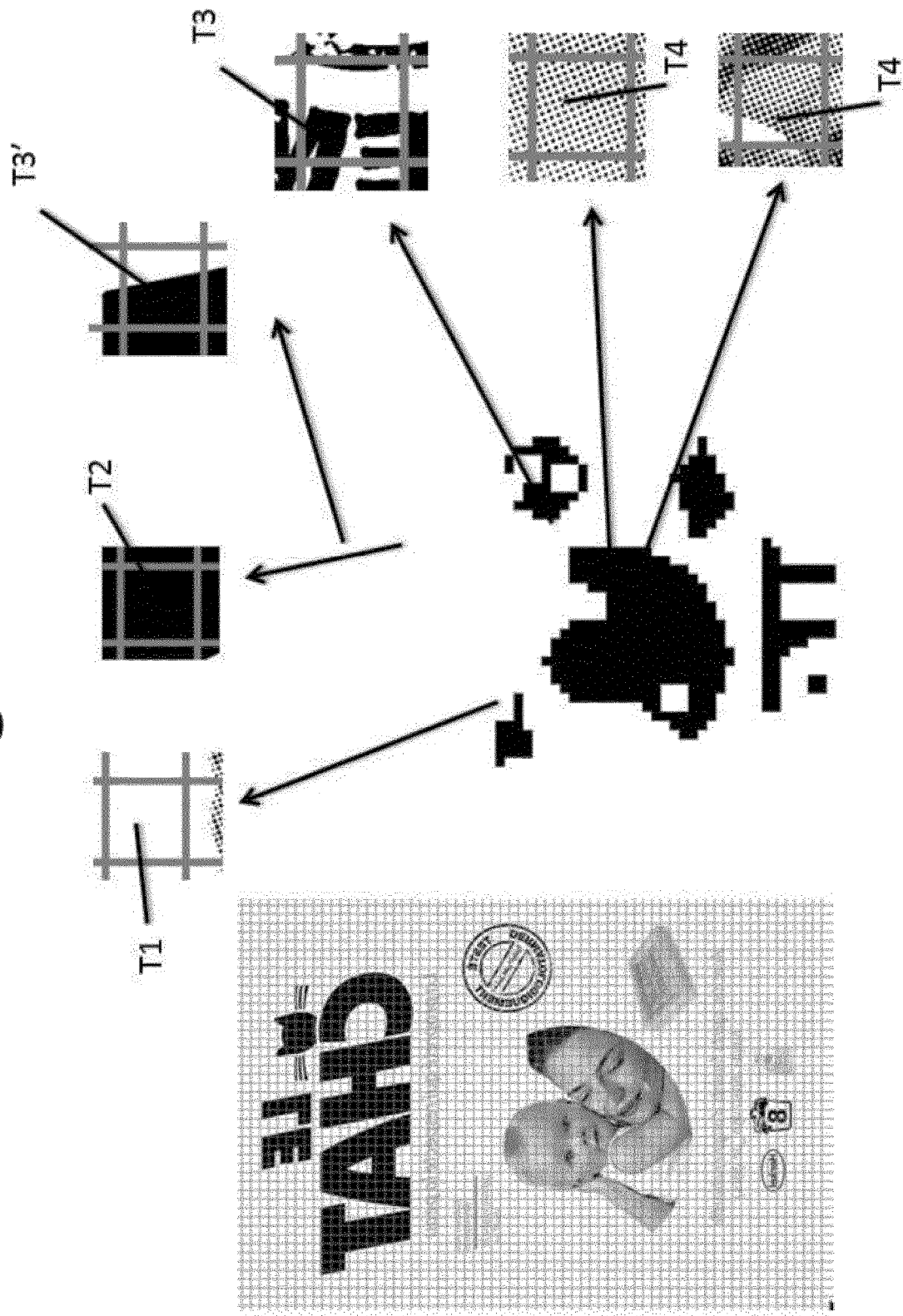

METHOD AND SYSTEM FOR PROCESSING A RASTER IMAGE FILE

This application is a national stage filing under 35 U.S.C. 371 of pending International Application No. PCT/EP2020/084454, filed Dec. 3, 2020, which claims priority to Netherlands Patent Application No. 2024368, filed Dec. 3, 2019, the entirety of which applications are incorporated by reference herein.

FIELD OF INVENTION

The field of the invention relates to methods and systems for processing a raster image file, to a processing module for performing such methods and to a relief structure obtained by such methods. More in particular, the invention relates to methods and systems for processing a raster image file for use in making relief precursors, and more in particular flexographic printing plate precursors or letterpress plate precursors.

BACKGROUND

Flexographic printing or letterpress printing are techniques which are commonly used for high volume printing. Flexographic or letterpress printing plates are relief plates with image elements protruding above non-image elements in order to generate an image on a recording medium such as paper, cardboard, films, foils, laminates, etc. Also, cylindrically shaped printing plates or sleeves may be used.

Various methods exist for making flexographic printing plate precursors. According to conventional methods flexographic printing plate precursors are made from multilayer substrates comprising a backing layer and one or more photocurable layers. Those photocurable layers are imaged by exposure to electromagnetic radiation through a mask layer containing the image information or by direct and selective exposure to light, e.g. by scanning of the plate to transfer the image information, in order to obtain a relief plate.

In flexographic or letterpress printing, ink is transferred from a plate to a print medium. More in particular, the ink is transferred on the relief parts of the plate, and not on the non-relief parts. During printing, the ink on the relief parts is transferred to the print medium. Greyscale images are typically created using half-toning, e.g. using a screening pattern. By greyscale is meant, for a plate printing in a particular color, the amount of that color being reproduced. For example, a printing plate may comprise different halftone dot regions to print with different densities in those regions. In order to increase the amount of ink transferred and to increase the so called ink density on the substrate, an additional very fine structure is applied to the surface of the printing areas, i.e. to the relief areas. This surface screening is typically obtained by adding the fine structure to the raster image file and then transferred to the corresponding mask used for exposure.

An example of an existing method for making a relief plate is illustrated in FIGS. 1A-1E. FIG. 1A shows the content of a raster image file having an image file resolution corresponding with a pixel size p of e.g. 6.35 micrometer. The illustrated raster image file has square-shaped pixels 4, and contains a substantially round image region 1 to be printed. The image file resolution may be e.g. 4000 dpi (=25400*1/p (in micrometer)). Next, the raster image file is manipulated using a surface screen pattern which is illustrated in FIG. 1B. The surface screen pattern is applied in the image region 1 resulting in a modified raster image file which is shown in FIG. 1C. As shown in FIG. 1C, the resulting image region 1' contains fewer pixels 4' to be printed, and the pixels 4' to be printed are located at a distance d of each other.

Based on the modified raster image file of FIG. 1C, a mask is prepared. More in particular, for every pixel 4' to be printed, a hole or a transparent region 5 is arranged in the mask. This may be done using a beam of electromagnetic radiation. As shown in FIG. 1D, such a beam will generate a hole 2, here a round hole 2, which is larger than the size of a pixel 4'. The resulting image on the mask is shown in FIG. 1E. The screen pattern resolution defined as the number of screen elements (pixels 4' corresponding with holes 5 in the mask) per inch, counted along a line where the distance between the closest screen elements is minimal, may be e.g. 1414 lpi ($=1/(2*\sqrt{2})*4000$) for the example of FIG. 1E. This is illustrated in FIG. 1C which shows that the closest distance has a value d (in micron), wherein the screen pattern resolution in lpi equals the inverse of d (in micron), multiplied by 25400.

Thus, according to the method illustrated in FIGS. 1A-1E, the surface screening is computed by changing the original raster image file, e.g. a tiff file, using software, typically a raster image processing technique, wherein typically due to the manipulation a file having a larger size is generated.

FIGS. 1A-1E illustrate a simple example of how a raster image file may be modified, but also more complex software-based image processing techniques may be used to manipulate the raster image file. Such techniques have the disadvantage that the image quality is improved only to a limited extent.

US 2013/0075376 A1 discloses a method for manufacturing a relief printing plate by direct engraving, comprising generating, from the binary image data, target stereoscopic shape data; calculating, based on the target stereoscopic shape data, exposure amount data; providing a predetermined exposure amount to an outside image adjacent pixel in a range of predetermined pixels adjacent to an ON pixel; and applying laser light to an area of OFF pixels based on the exposure amount data to engrave a portion outside of an area, and applying laser light to the outside image adjacent pixel based on the predetermined exposure amount to form a relief having a projecting shape with a corner part of a flange part of a top face of the relief at least partially chamfered.

SUMMARY

The object of embodiments of the invention is to provide a method and a system which can improve the image quality in a more robust and simple manner.

According to a first aspect a method for processing a raster image file is provided. The method comprises the following steps:

receiving of a raster image file comprising image data for a plurality of pixels, analyzing the image data of the raster image file, determining control data, and optionally at least one new raster image file, based on the analyzed image data, said control data being data for controlling settings of an imaging device so as to change the physical properties of generated imaged features corresponding with one or more of the plurality of pixels;

outputting the raster image file and/or the new raster image file, with the control data to an imaging device for imaging a relief precursor.

Embodiments of the invention are based inter alia on the inventive insight that the image quality can be improved if the imaging is controlled using control data which is based on image data included in a raster image file. For example, depending on whether the image data includes text and/or a photo and/or a bar code and/or large continuous areas, etc., the imaging may be controlled in a different manner. Thus, according to the method of the invention, not only the image data in the raster image file and/or manipulated image data in the new raster image file are output to the imaging device, but also imaging control data based on an analysis of the image data included in the raster image file, are directly used to control the imaging device, preferably without storing the control data. Such control data can also be included in a relatively small file, e.g. a so-called "job" file, as opposed to the new manipulated raster image files of the prior art which are typically very large. Optionally, the control data may be included in the raster image file and/or in the new raster image file.

Preferably, the raster image file is sent to the imaging device without further processing/manipulating the image data in the raster image file, and it is the control data which can achieve similar or better results than the results obtained with new manipulated raster image files of the prior art. Moreover, the larger file size of the new manipulated raster image files of the prior art requires more storage and longer transmission times, which make these processes slow and extensive. The control data can be included in the raster image file. For example, when the raster image file provides multiple bits per pixel, some bits may be used for the control data. However, if the image data in the raster image file would be manipulated (although this is not preferred), then the control data may also be added to the new raster image file containing the manipulated data. Alternatively, the control data may be sent separately to the imaging device, e.g. in a job file.

In a preferred embodiment, the imaged features correspond with exposed areas of a mask layer. For example, the imaged features may correspond with holes or areas with a changed transparency as a result of the imaging. The change of transparency may be achieved by ablation, bleaching, color change, refractive index change or combinations thereof. Preferably, ablation or bleaching are employed.

In other embodiments the exposed areas may correspond with exposed areas of a photosensitive layer of a relief precursor. For example, the imaging device could be a beam of electromagnetic radiation (e.g. a UV laser), and the imaged features could be exposed features of the photosensitive layer. In that case, a mask layer is not required, the photosensitive layer is cured by the interaction with the electromagnetic radiation and after developing, the imaged features correspond to the relief features used e.g. for printing. In such an embodiment, the method would comprise the steps of:

provinding of a relief precursor comprising at least one photosensitive layer,
receiving of a raster image file comprising image data for a plurality of pixels,
analyzing the image data of the raster image file,
determining control data, and optionally at least one new raster image file, based on the analyzed image data, said control data being data for controlling settings of an imaging device so as to change the physical properties of generated imaged features corresponding with one or more of the plurality of pixels;
imaging the relief precursor with the imaging device, such as a UV laser, using the raster image file and/or the new raster image file, with the control data;
developing the relief precursor to remove non-imaged areas of the relief precursor.

Preferably, the developing is achieved by treatment with liquids (solvents, water or aqueous solutions) or by thermal development, wherein the liquefied or softened material is removed. Examples of possible development techniques are described below.

Preferably, the raster image file and/or the new raster image file used in the imaging step, represents two-dimensional image data. For example, the file may be a 1 bit per pixel file or a multi-level image file with multiple bits per pixel. In other words, this may be a standard raster image file which only includes two-dimensional image data and no three-dimensional data.

Preferably, the control data is control data for controlling the settings of an exposure means of the imaging device, and in particular for controlling a beam generating means, and more in particular for controlling the beam of the beam generating means. Typically, the control data will comprise at least a first and a second different setting of a control parameter, wherein the first setting is to be used for a first pixel or group of pixels and the second setting is to be used for a different second pixel or group of pixels. For example, the first setting may specify a first beam size and/or beam shape and/or beam intensity to be used for a first pixel or group of pixels and the second setting may specify a second different beam size and/or beam shape and/or beam intensity to be used for a different second pixel or group of pixels. In addition to the first and second setting more settings may be used for additional pixels or groups of pixels.

Preferably, the control data is representative for information about one or more properties of an imaged feature or group of imaged features corresponding with a pixel or a group of pixels and/or information about a feature to be added to an imaged feature or group of imaged features, or about one or more pixels not to be imaged. For example, the information about one or more properties of an imaged feature or group of imaged features may comprise any one or more of the following:

a desired size of an imaged feature or of a group of imaged features corresponding with a pixel or a group of pixels; for example the control data can be a diameter of the beam which will be representative for the size of a pixel;
a desired shape of an imaged feature or a group of imaged features corresponding with a pixel or a group of pixels; for example the beam may have a round, an oval or rectangular shaped cross section;
a desired location of an imaged feature or a group of imaged features corresponding with a pixel or a group of pixels; for example, the beam may expose a spot in the center of four neighboring pixels;

In other words, the control data may be related to a desired property, such as a size and/or shape or location of an imaged feature, i.e. of a physical feature obtained after imaging. The imaged feature may correspond e.g. with an exposed area (e.g. of a mask layer) or with a relief feature. The control data may indicate that an additional imaged feature, i.e. an additional physical feature is to be added.

For example, the control data may specify to use a beam size for a group of pixels which is such that adjacent imaged features corresponding with adjacent pixels do not overlap, and to add a number of additional imaged features between adjacent imaged features corresponding with adjacent pixels of the group of pixels. In that manner a very fine surface screen can be obtained in the area corresponding with the group of pixels.

In another example, the control data may specify to use a beam size for a group of pixels which is such that adjacent imaged features corresponding with adjacent pixels overlap, and not to image a number of pixels of the group of pixels, such that non-imaged zones are created in an area corresponding with the group of pixels. Also in that manner a surface screen can be obtained in the area corresponding with the group of pixels.

In other words the control data may control how a pixel or a group of pixels has to be imaged, such that different pixels or groups of pixels of the same raster image file may be imaged in a different manner.

Preferably, the control data comprises any one or more of the following or a combination thereof:

- an intensity value to be used for generating an imaged feature or a group of imaged features corresponding with a pixel or a group of pixels, e.g. an intensity value for controlling a beam of the imaging device; by changing the intensity value the imaged feature can be changed, e.g. the size thereof can be changed;
- an on/off signal of a beam of the imaging device for generating an imaged feature or a group of imaged features corresponding with a pixel or a group of pixels; also by changing the on/off signal (e.g. the timing of the on/off signal), the imaged feature can be changed, e.g. the size and/or shape thereof can be changed;
- a time interval to be used for generating an imaged feature or a group of imaged features corresponding with a pixel or a group of pixels, e.g. an on-time value for controlling a beam of the imaging device; also by changing the time interval, the amount of energy used for generating an imaged feature is changed, and this will influence the physical properties of the imaged feature;
- a beam diameter value or beam shape value for controlling a beam of the imaging device;
- a number of passes of an imaging step to be performed by the imaging device; multiple passes may be used to get more energy in isolated single pixel features. Single pixels do not have neighbors to "help" ablation and may need more energy per pixel than multi-pixel features. By defining the number of passes for a pixel or group of pixels, e.g. for all single pixels, sharper images may be obtained;
- an indication of an exposure head of a plurality of exposure heads to be used for generating an imaged feature or a group of imaged features corresponding with a pixel or a group of pixels; for example, a first group of pixels may be exposed with a first exposure head and a second image group of pixels may be exposed with a second exposure head;
- a value representative for a beam path of the imaging device, such as a value representative for a location of a spot to be exposed by the beam of the imaging device different from the location of the spot in the raster image file; for example in case of a beam diameter being smaller than a pixel, the beam may be placed in the center or close to a corner of a pixel;
- or combinations thereof.

According to a preferred embodiment, the analyzing is performed such that it reveals any one or more of the following:

- pixels contributing to an image included in the image data, and pixels not contributing to an image included in the image data;
- image areas with pixels contributing to an image included in the image data, areas without any pixels contributing to an image included in the image data, image areas with all pixels contributing to an image included in the image data; in other words the edges of various image areas and non-image areas may be determined;
- a screen ruling or screen frequency being the resolution of a halftone screen, typically measured in lines per inch (lpi), specifying the distance of the lines of equidistant dots, wherein each dot corresponds with a halftone area;
- a screen angle to be used, the angle at which the halftones of a separated color is imaged;
- for one or more target pixels of said plurality of pixels, a number of neighboring pixels of the target pixel contributing to an image included in the image data, and/or for one or more target pixels of said plurality of pixels, a number of neighboring pixels of the target pixel not contributing to an image included in the image data, in that manner it can be determined if a pixel is isolated or part of an edge of an image area or fully surrounded by other pixels of the image;
- for one or more target pixels of said plurality of pixels, an orientation or position of neighboring pixels of the target pixel contributing to an image included in the image data; for example, it may be indicated how far away from a target pixel other pixels are present and how many other pixels are present. This may be helpful to decide to enforce the target pixel if there are not enough close other pixels. Isolated pixels or a contiguous group of pixels in a small area in the middle of nothing else may otherwise not be strong enough to survive a washout process; for example, it may be indicated that a line of red pixels is present adjacent a single pixel,
- for one or more target pixels of said plurality of pixels, information on a size of an image area to which the target pixel belongs,
- for one or more target pixels of said plurality of pixels, a structure of an image area (e.g. dot, line, character) to which a target pixel belongs,
- for one or more target pixels of said plurality of pixels, a distance between the target pixel and an edge of the image area.

The control data may be calculated based on an algorithm or attributed according to a predefined property table or according to predefined rules.

According to an exemplary embodiment, the analyzing comprises analyzing a plurality of groups of pixels of the raster image file, and the determining comprises determining control data for at least one group of said plurality of groups based on the analyzing. For example, for one or more groups a different beam size may be used as compared to one or more other groups of pixels.

Preferably, each group comprises a number of neighboring pixels, wherein the number is at least two, preferably at least four, more preferably at least six, most preferably at least eight, even more preferably at least twenty four, e.g. at least forty eight.

The plurality of groups may correspond with a plurality of tiles of pixels. A tile may have any shape and may be e.g. rectangular or square. The analyzing may comprise deriving whether a tile is trivial or non-trivial based on at least one predetermined triviality criterion, and the determining may comprise determining for each non-trivial tile at least one characteristic, wherein the control data is based on said characteristic. The determining may further comprise determining a path through trivial tiles, said path splitting the raster image file in a first and a second part, e.g. a left and a right part. Optionally the path may split the raster image files in more than two parts. This is advantageous when two or more sources for the imaging beam (exposure heads) are used which image the mask simultaneously and independently from each other. A triviality criterion may be, whether the tile contains pixels which contribute to the image or not. Another triviality criterion may be whether a tile contains simple image data, e.g. no contributing pixels, all contributing pixels, line work only and no screening. The latter will be useful in order to decide whether a tile can be split in order to be imaged by different exposure heads. For example, line work typically does not pose problems when a tile is split whilst splitting a tile containing screened areas is more risky.

According to an exemplary embodiment where an imaging device with a number of parallel imaging beams is used, the plurality of groups may correspond with a plurality of strips, wherein the width of a strip corresponds substantially with a width imaged by the number of imaging beams. In general the width of the stripe is the width of the number of pixels that are imaged by the group of parallel beams of an imaging head. When an imaging head comprises for example 6 beams, the width of the stripe is 6 pixels wide. But it is also possible to image only every second pixel with the fixed number of beams and in this case the width of the stripe is 11 pixels. The length of the strip corresponds to the size of the image file in the direction parallel to the moving direction of the beams and its maximum length may correspond to the maximum length of the beam path. In a setup where the precursor is mounted onto a rotating drum, the maximum length may correspond to the drum circumference.

In an exemplary embodiment, the analyzing comprises analyzing a pixel of a group, combined with the data of one or more neighboring groups, to determine for every pixel of the plurality of pixels, if the pixel is an imaging pixel and/or if the pixel is part of an image item which is smaller than a predetermined size and/or if the pixel is surrounded by one or more non-imaging pixels.

In an exemplary embodiment, the analyzing comprises deriving image items with predetermined size properties, and wherein the determining comprises generating a new raster image file in which a surface screening pattern is added to the image items with the predetermined size properties and not to the remaining part of the image data.

The raster image file may be a 1 BPP (1 bit per pixel) file or a multi-level image file with multiple bits per pixel (such that a pixel can have various grey levels). The raster image file may have any one of the following file formats: TIFF, LEN, JPEG, JPG, BMP, JDF, PNG, etc.

Optionally, the control data may be stored, e.g. in a multilevel raster image file, such as a multi-level TIFF file or in a job file (a generalized descriptive file that can be interpreted by the imaging device), such as a JSON file. However, it is also possible to apply the derived control data directly using hardware, preferably applying it "on the fly" with storing the control data.

The imaging device may be a system comprising an imager and optionally different units for pre- or post-processing (e.g. an exposure unit, a washer, a dryer, a light finisher) to generate a relief precursor.

According to an exemplary embodiment, the control data indicates any one of the following:
  to apply a determined intensity to a pixel of the plurality of pixels;
  for one or more image areas of the image data larger than a predetermined size, to apply a determined intensity to the one or more image areas;
  for one or more isolated pixels of the plurality of pixels, to add an additional imaged feature to the isolated imaged feature corresponding with the isolated pixel and/or to apply an increased intensity to generate the isolated imaged feature and, if present, the added imaged feature; in other words, for isolated pixels, a beam with a higher intensity may be used; alternatively, the radiation time period may be increased for isolated pixels;
  for one or more image areas of the image data smaller than a predetermined size, to add an additional imaged area in or near the one or more image areas;
  for one or more isolated pixels of the plurality of pixels, to change the location of the center of the beam away from the center of the pixel.

According to an exemplary embodiment, the control data is derived and applied directly in the imaging device without storage of a file.

According to an exemplary embodiment, the control data is derived by taking further aspects into account which are related to printing and/or processing conditions. Such printing conditions are e.g. printing direction, nature of printing substrate, properties of anilox roll (size, ruling of pits), printing speed, printing pressure, the type of ink, and combinations thereof. For example, it may be important to take the printing direction into account since it determines which part of an image feature is impacted first and stronger than other parts of the image feature, and consequently these other parts may be treated differently compared to the part which is impacted first. The part of the image feature that is impacted first may be enforced for example by using a larger beam diameter or adding imaged features. An example of a processing condition is e.g. the type of light source used (LED versus light tubes), the type of development used (e.g. thermal versus solvent development).

In embodiments of the invention, the control data may be determined in advance of the imaging or it may be determined during imaging. For example, the imaging may start as soon as a portion of the control data is determined, said portion being the portion relevant for a first part that is being imaged.

According to a second aspect of the invention, there is provided a method to generate a relief structure, comprising the steps of:
  providing of a relief precursor comprising a substrate layer, at least one photosensitive layer and a mask layer (integral or added),
  performing the method according to any one of the previous embodiments,
  imaging the relief precursor using the raster image file and/or the new raster image file, with the control data, such that an image is generated in the mask layer,
  exposing the imaged relief precursor to electromagnetic radiation through the imaged mask layer,
  removing soluble or liquidifiable material (developing), and optionally further steps, such as drying, light finishing, cutting, etc.

Also, the invention relates to a relief structure obtained by such a method.

The mask layer may be an integral part of the relief precursor or may be a separate item, which is attached to the relief precursor before exposure to electromagnetic radiation.

The imaging device used for the imaging step may be configured to generate electromagnetic radiation capable to modify the transparency of the mask layer. The change of transparency may be achieved by ablation, bleaching, color change, refractive index change or combinations thereof.

Preferably ablation or bleaching are employed.

Examples of solidifiable materials that may be used in embodiments of the invention are photosensitive compositions, which solidify or cure due to a chemical reaction, which leads to polymerization and/or crosslinking Such reactions may be radical, cationic or anionic polymerization and crosslinking. Other means for crosslinking are condensation or addition reactions e.g. formation of esters, ethers, urethanes or amides. Such composition may include initiators and/or catalysts, which are triggered by electromagnetic radiation. Such initiators or catalysts can be photo-initiator systems with one or more components that form radicals, acids or bases, which then initiate or catalyze a reaction, which leads to polymerization or crosslinking. The necessary functional groups can be attached to low molecular weight monomers, to oligomers or to polymers. In addition, the composition may comprise additional components such as binders, filler, colorants, stabilizers, tensides, inhibitors, regulators and other additives, which may or may not carry functional groups used in the solidification reaction. Depending on the components used, flexible and/or rigid materials can be obtained after the solidification and post treatment is finished.

The radical reaction may be a radical polymerization, a radical crosslinking reaction or a combination thereof. Preferably, the photosensitive layer is rendered insoluble, solid or not meltable by a radical reaction.

Preferably, the removal of the soluble or liquidifiable material is achieved by treatment with liquids (solvents, water or aqueous solutions) or thermal development, wherein the liquefied or softened material is removed. Treatment with liquids may be performed by spraying the liquid onto the precursor, brushing or scrubbing the precursor in the presence of liquid. The nature of the liquid used is guided by the nature of the precursor employed. If the layer to be removed is soluble, emulsifiable or dispersible in water or aqueous solutions, water or aqueous solutions might be used. If the layer is soluble, emulsifiable or dispersible in organic solvents or mixtures, organic solvents or mixtures may be used. Preferably liquids comprising naphthenic or aromatic petroleum fractions in a mixture with alcohols, such as benzyl alcohol, cyclohexanol, or aliphatic alcohols having 5 to 10 carbon atoms, for example, and also, optionally, further components, such as, for example, alicyclic hydrocarbons, terpenoid hydrocarbons, substituted benzenes such as diisopropylbenzene, esters having 5 to 12 carbon atoms, or glycol ethers, for example.

For thermal development, a thermal development unit, wherein the flexible plate is fixed on the rotating drum, may be used. The thermal developing unit further comprises assemblies for heating the at least one additional layer and also assemblies for contacting an outer surface of the heated, at least one additional layer with an absorbent material for absorbing material in a molten state. The assemblies for heating may comprise a heatable underlay for the flexible plate and/or IR lamps disposed above the at least one additional layer. The absorbent material may be pressed against the surface of the at least one additional layer by means, for example, of an optionally heatable roll. The absorbent material may be continuously moved over the surface of the flexible plate while the drum is rotating with repeatedly removal of material of the at least one additional layer. In this way molten material is removed whereas non-molten areas remain and form a relief.

According to a further aspect, there is provided a processing module configured to perform the steps of the method of any one of the previous embodiments.

According to yet another aspect, there is provided imaging system comprising such a processing module and an imaging device configured for imaging a relief precursor using the raster image file with the control data and/or the new raster image file, such that an image is generated in a mask layer of the relief precursor.

Optionally, the imaging system may further an exposure unit, a washer, a dryer, a light finisher or any other post-exposure unit, in order to generate a relief structure as described above. Optionally, a controller may be provided to control the various units of the imaging system. Optionally, one or more pre-processing modules, such as a raster image processing (RIP) module which converts an image file, such as a pdf file, into a raster image process file, may be provided upstream of the processing module.

BRIEF DESCRIPTION OF THE FIGURES

The accompanying drawings are used to illustrate presently preferred non-limiting exemplary embodiments of methods and systems of the present invention. The above and other advantages of the features and objects of the invention will become more apparent and the invention will be better understood from the following detailed description when read in conjunction with the accompanying drawings, in which:

FIGS. 1A-1E illustrate schematically an embodiment of the prior art;

FIGS. 2-5 illustrate three exemplary embodiments of a system and method according to the invention;

FIGS. 10A-10D illustrate a further exemplary embodiment of the step of analyzing a raster image file in order to determine control data.

DETAILED DESCRIPTION OF EMBODIMENTS

Figure 4:
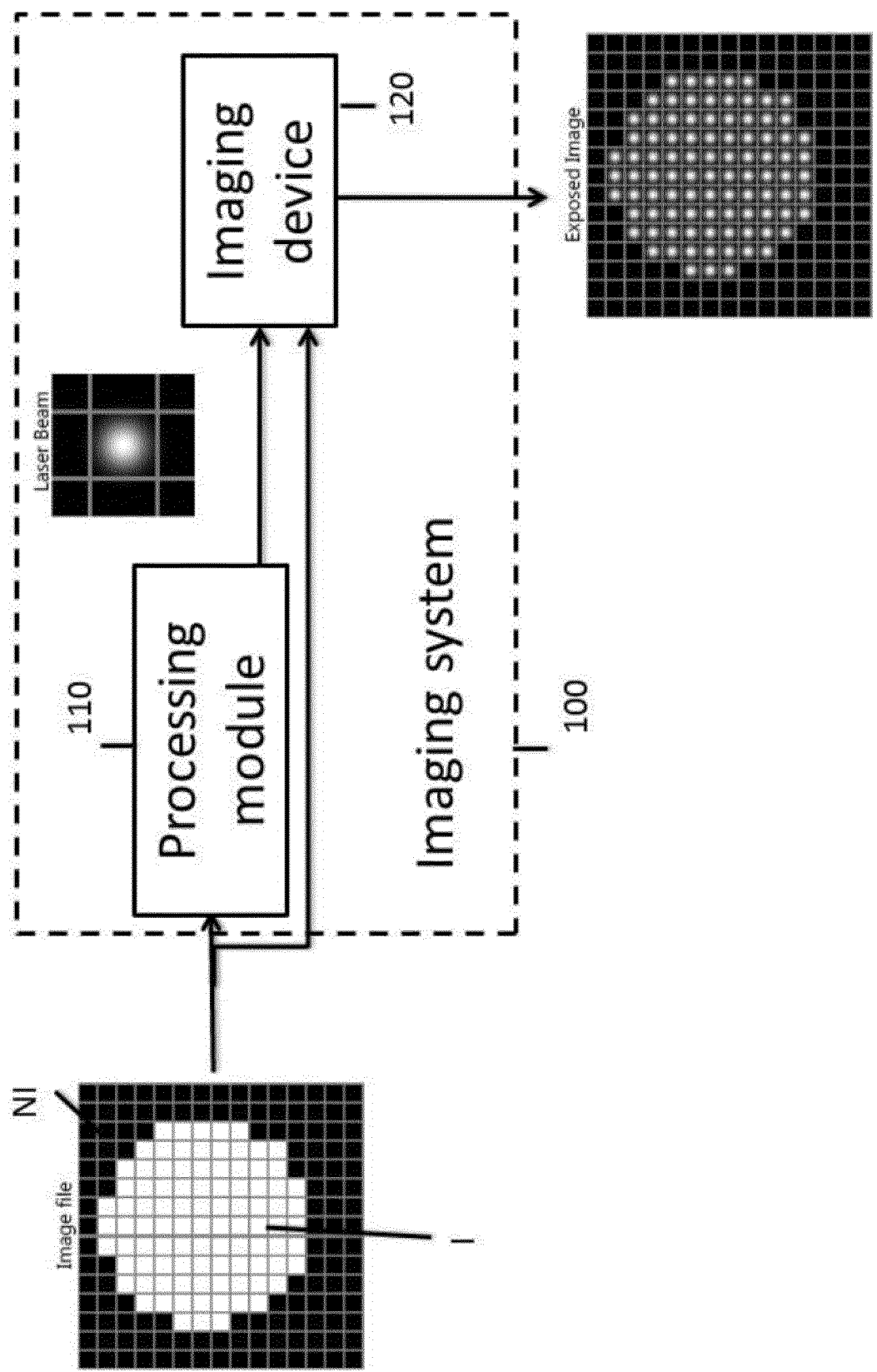

FIG. 2 illustrates a first embodiment of a system comprising a raster image processing (RIP) module 10 and an imaging system 100. The imaging system 100 comprises a processing module 110 and an imaging system 120.

The RIP module 10 converts a source image file, here a pdf file, into a raster image file, which is entered into the processing module 110 and into the imaging device 120 of the imaging system 100. The RIP module 10 is a component used in image processing which produces a raster image file also known as a bitmap. The source image file may be a page description in a high-level page description language such as PostScript, Portable Document Format, XPS or another bitmap. In the latter case, the RIP applies either smoothing or interpolation algorithms to the input bitmap to generate the output bitmap. Raster image processing is the process of turning e.g. vector digital information such as a PostScript file into a high-resolution raster image file. Usually the RIP module 10 is implemented either as a software component of an operating system or as a firmware program executed on a microprocessor. The RIP module 10 may further have a layout function.

When a plurality of small images needs to printed, those images may be grouped according to print patterns. This grouping may also be done by the RIP module 10.

The raster image file output by the RIP module 10 is input in the processing module 110. In the processing module 100, the following steps are performed:
- receiving of the raster image file comprising image data for a plurality of pixels,
- analyzing the image data of the raster image file,
- determining control data based on the analyzed image data, said control data being data for controlling settings of an imaging device so as to change the physical properties of generated imaged features corresponding with the plurality of pixels;
- outputting the control data to the imaging device 120 for imaging a relief precursor.

FIG. 3 illustrates a second embodiment of a system comprising a raster image processing (RIP) module 10 and an imaging system 100. The imaging system 100 comprises a processing module 110 and an imaging system 120.

The RIP module 10 converts a first image file, here a pdf file, into a raster image file which is entered into the processing module 110 of the imaging system 100. In the processing module 100, the following steps are performed:
- receiving of the raster image file comprising image data for a plurality of pixels,
- analyzing the image data of the raster image file,
- determining control data and at least one new raster image file, based on the analyzed image data, said control data being data for controlling settings of an imaging device so as to change the physical properties of generated imaged features corresponding with the plurality of pixels;
- outputting the new raster image file with the control data to the imaging device 120 for imaging a relief precursor.

In the embodiment of FIG. 2, the raster image file is not modified and the control data will contain control information for controlling the settings of the imaging device in order to modify the imaging in function of the image areas in the raster image file. In the embodiment of FIG. 3, the raster image file is modified to create a new raster image file (for example pixels may be added or removed in function of the image data included in the raster image file), and on top of that the control data will contain control information for controlling the settings of the imaging device 120 in order to modify the imaging in function of the image areas in the raster image file.

The control data may be included in the raster image file or in the new raster image file, or it be include in a separate job file, or it may be directly sent to the imaging device 120. When, the control data is included in a file, the imaging device 120 may be provided with an interpreting function to interpret the file and may be configured to generate suitable control signals for controlling the imaging device 120, based on the control data included in the file.

FIG. 4 illustrates schematically an example where control data is generated based on a very simple example of a raster image file. The raster image file contains 15×15 pixels. The processing module 110 will analyze the raster image file and may determine pixels contributing to an image included in the image data, and pixels not contributing to an image included in the image data. For example, the analyzing will reveal a central image area I with all pixels contributing to the image and a surrounding image area NI without any pixels contributing to the image.

Figure 8:
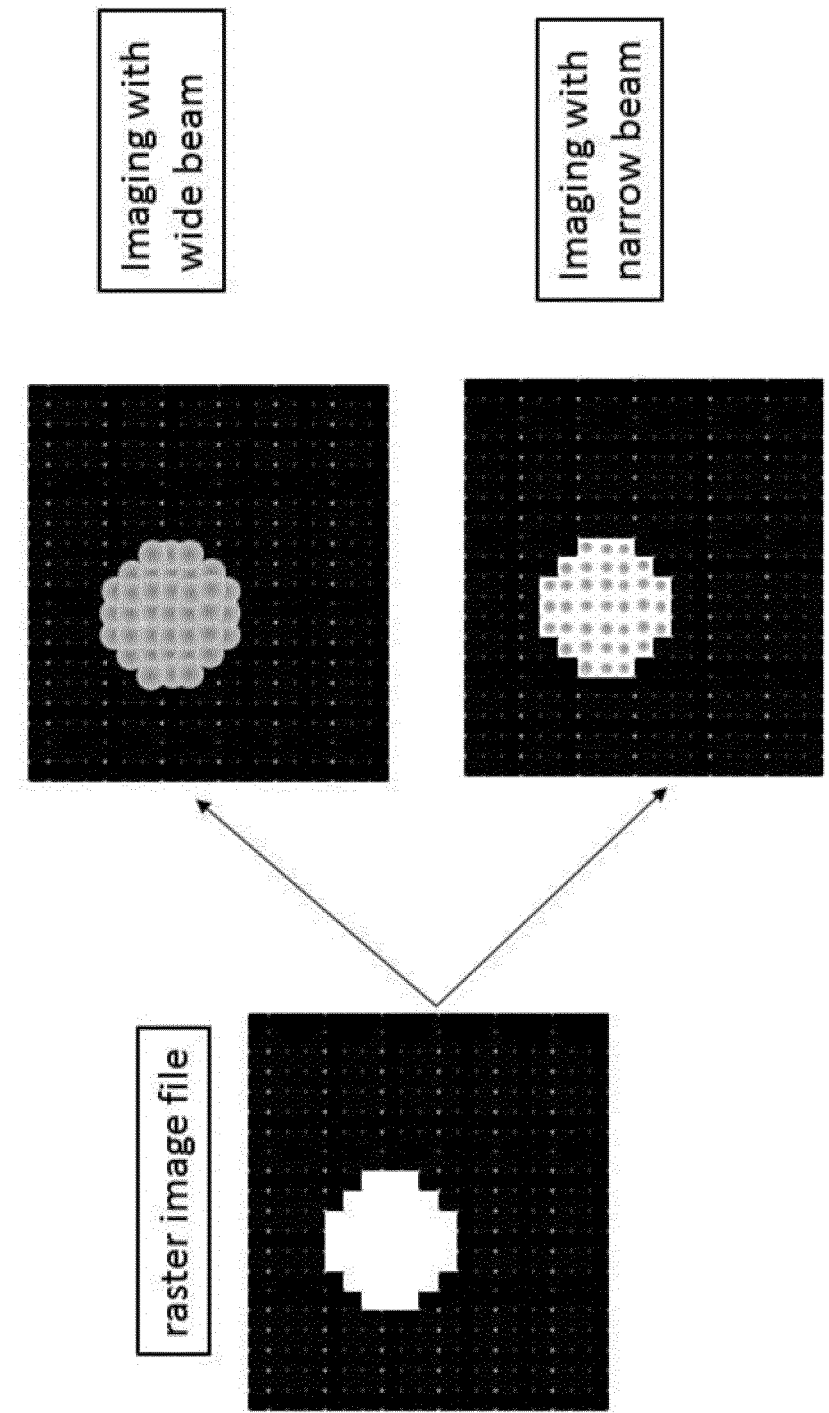
FIGS. 8 and 9 illustrate the impact of different control data on the imaged features in accordance with different exemplary embodiments.

Next control data may be generated for the image area I. In this example the generated control data is representative for a desired size of an imaged feature corresponding with a pixel and a desired shape of an imaged feature corresponding with a pixel. More in particular, the control data characterizes the diameter and shape of the beam to be generated by the imaging device. For example, the control data may specify the beam diameter to be used in the image area I. FIG. 8 illustrates the effect of using a smaller or a larger beam diameter for imaging. Depending on the size of the beam, non-imaged zones can be created or not between image features, i.e. imaged features corresponding with adjacent pixels may overlap or not. Also, the distance between adjacent imaged features can be adjusted by adjusting the beam size. Here the control data are used to control the diameter of the beam. In a first example a beam with a diameter larger than the pixel size is used and the imaged areas of the beam do overlap. This makes sure that the mask material is completely removed and the size of the image feature is slightly increased which can be used to compensate a decrease of image feature size due to the following process steps. In a second example a beam with a diameter smaller than the pixel size is used and the imaged areas of the beam do not overlap. In this manner the mask is only partially removed resulting in the formation of a structured surface of the relief feature. This structured surface may improve the ink carrying capabilities of the relief structure, resulting in printed images with a higher quality.

In the illustrated example of FIGS. 4 and 8, the same beam diameter is used for all pixels of the image area I, but the skilled person understands that it is also possible to vary the beam diameter within an image area. For example, the beam size could be larger near the edge and smaller in the center of the image area I. In that manner, it becomes possible to create a closed edge of the image area I. This may be advantageous to maintain the ink on the relief area corresponding with the image area I. The smaller beam may be located in the center of a pixel or in a corner of a pixel. In the latter case the distribution of the beam in neighboring pixels may be varied, e.g. in the case of four pixels forming a square, the beams may be located near the center of the four pixels or in the outmost corners of the pixels or in one of the other potential arrangements.

Instead of using a beam diameter as a control parameter, also other parameters may be used to control the size and/or the shape of a beam. For example, any one of the following parameters may be used: an intensity value for controlling a beam of the imaging device, an on/off signal of the beam, an on-time of the beam, a number of passes of the beam, etc.

Figure 5:
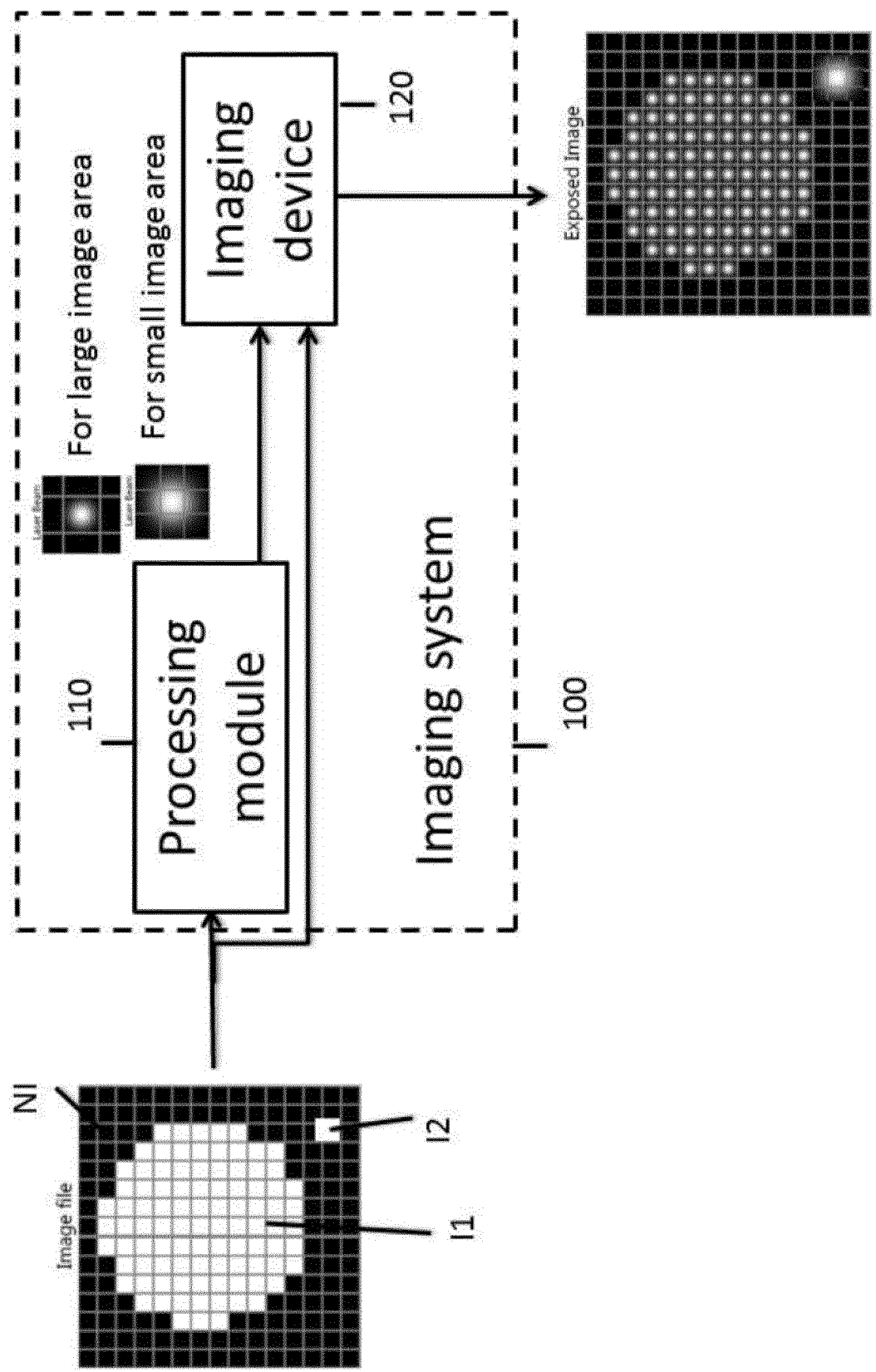

FIG. 5 illustrates schematically a further example where control data is generated based on a very simple example of a raster image file. The processing module 110 analyzes the raster image file and may determine pixels contributing to an image included in the image data, and pixels not contributing to an image included in the image data. For example, here the analyzing will reveal a first image area I1 with all pixels contributing to the image, a second image area I2 with a single isolated pixel, and a surrounding image area NI not contributing to an image.

Next control data may be generated for the image areas I1, I2. In this example the generated control data is representative for a desired size of an imaged feature corresponding with a pixel and a desired shape of an imaged feature corresponding with a pixel. More in particular, the control data characterizes the diameter and shape of the beam to be generated by the imaging device. For example, the control data may specify the beam diameter to be used in the image area I1 to have a first value, and the beam diameter in the image area I2 to have a second value different from the first value. In this example, the beam diameter to be used for the isolated pixel of image area I2 may be chosen to be larger than the beam diameter to be used in the larger image area I1. In that manner, it can be avoided that the relief area corresponding with the image area I2 is too small. In the illustrated example, the same beam diameter is used for all pixels of the larger image area I1, but the skilled person understands that it is also possible to vary the beam diameter within an image area. As mentioned in connection with FIG. 4, instead of using a beam diameter as a control parameter, also other parameters may be used to control the size and/or the shape of a beam.

Figure 6:
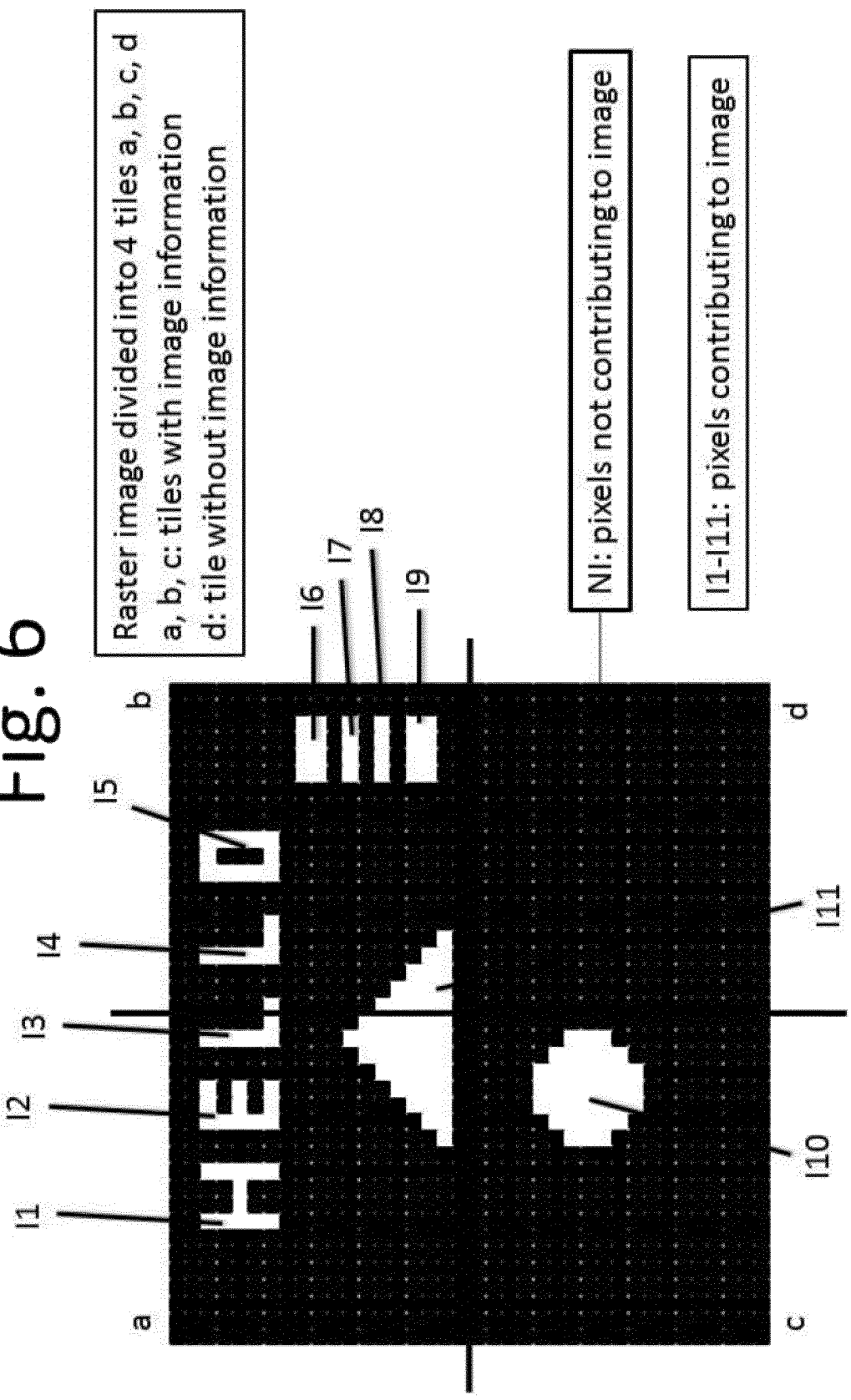
FIGS. 6 and 7 illustrate two exemplary embodiments of the step of analyzing a basic raster image file in order to determine control data.

FIG. 6 illustrates a further example of a raster image file containing image areas I1-I5 representing text and image areas I6-I9 representing a bar code and image areas I10, I11 representing figures, and a non-image area NI. The processing module 110 analyzes the raster image file and may determine pixels contributing to an image included in the image data, and pixels not contributing to an image included in the image data. For example, here the analyzing will reveal image areas I1-I11 with all pixels contributing to the image and a surrounding image area NI without any pixel contributing to the image. It is noted that the analyzing could also classify image areas I1-I5 as a single text area and image areas I6-I9 as a single bar code area, wherein within the text area some pixels contribute to the text and others do not contribute to the text and within the bar code area some pixels contribute to the bar code and others do not.

The analysis may be done on a tile per tile basis. In FIG. 6, the raster image is divided into four tiles a, b, c, d. The analyzing may comprise deriving whether a tile is trivial or non-trivial based on a predetermined triviality criterion. In the present example, tiles a, b, c are classified as non-trivial as they all contain relevant image areas, and tile d is a trivial tile since this tile does not require any treatment by the imaging device. The determining may comprise determining for each non-trivial tile a characteristic, and in the present case control data may be determined for each tile. For example, for a trivial tile such as tile d, the control data could be a command "skip tile". In that manner, tile d can be omitted completely during imaging which saves time.

Next control data may be generated for the image areas I1-I11. The control data generated for the text area I1-I5 and the bar code area I6-I9 may be such that the edges of the letters and bars are neatly delimited. For example, barcodes are better readable if the ink density on print is higher (better ink coverage). This could be achieved with surface screening and surface screening could be switched on for these areas using appropriate control data.

Figure 7:
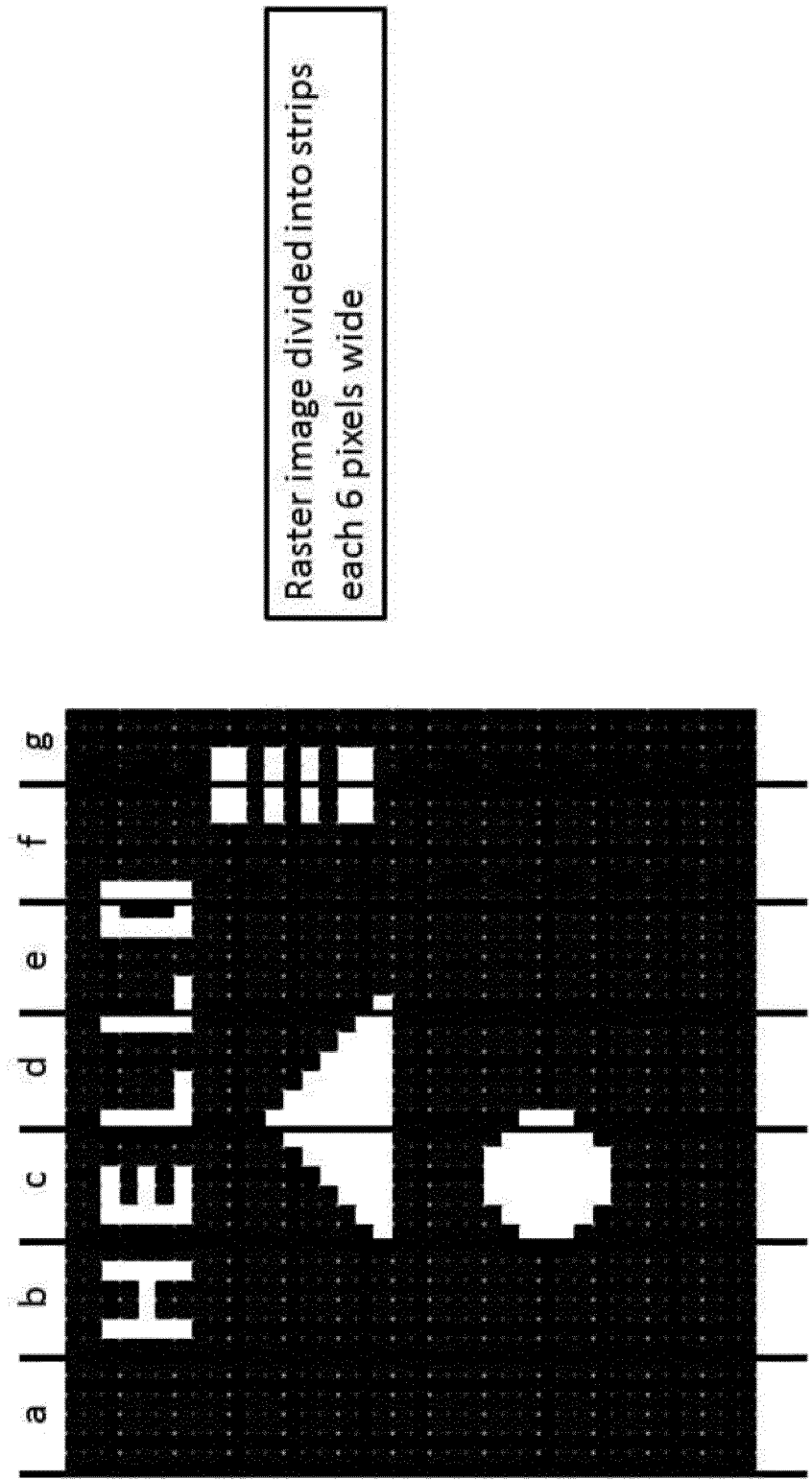

FIG. 7 shows an example which is similar to the example of FIG. 6 with this difference that the analysis is done according on a strip per strip basis, see strips a, b, c, d, e, f, g which extend from the top to the bottom of the pixel region. The analyzing may comprise deriving whether a strip is trivial or non-trivial based on a predetermined triviality criterion. In the present case, strips b, c, d, e, f, g are non-trivial as they all contain relevant image areas, and strip a is a trivial strip. Instead of merely classifying the strips in trivial or non-trivial, also more than two classes may be used. For example, for strip b it can be determined that the strip contains text, and for strip c it can be determined that the strip contains line work. The width of a strip may correspond substantially with a width imaged by a number of parallel imaging beams of the imaging device.

Next control data may be generated for the strips a-g. The control data generated for the strips a-g, may take into account that image areas I1-I5 contain text, and will ensure that the edge zones between adjacent strips match well. Also in such an embodiment, for a trivial tile such as tile d, the control data could be a command "skip tile". In that manner, tile a can be omitted completely during imaging which saves time.

In further developed embodiments, pixels may be added or removed, and this may be indicated in the control data. Alternatively a new raster image file may be prepared as in the embodiment of FIG. 3.

Figure 9:
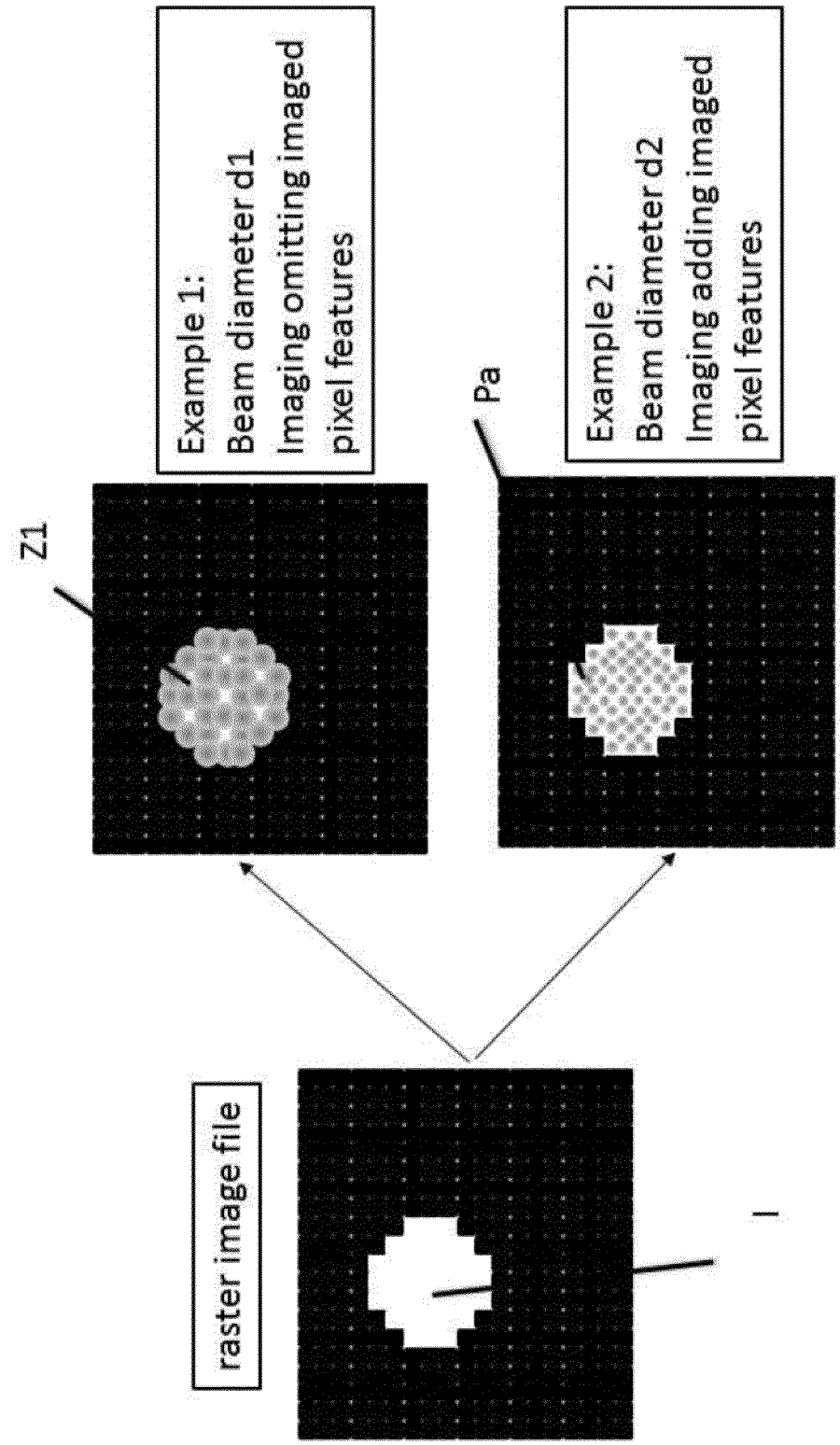

FIG. 9 illustrates a first example (example 1) where the control data indicates to use a first beam diameter d1 and not to image a number of pixels in an image area I. The beam diameter d1 is relatively large such that adjacent imaged pixel features overlap. By not imaging a number of pixels, small non-imaged zones Z1 remain in the imaged area (i.e. a surface screen pattern is obtained), and those zones Z1 will create small valleys in the resulting relief structure. Such valleys may improve the ink carrying capabilities of the relief structure, resulting in printed images with a higher quality.

FIG. 9 further illustrates a second example (example 2) where the control data indicates to use a second beam diameter d2 and to add a number of imaged features in an image area I. The beam diameter d2 is relatively small such that adjacent imaged pixel features do not overlap. By adding a number of imaged features Pa, a very fine surface screen pattern of small imaged zones is created, and those zones will create many small tops in the resulting relief structure. Such a pattern of many small tops may improve the ink carrying capabilities of the relief structure, resulting in printed images with a higher quality.

The skilled person understands that many variants of the examples 1 and 2 exist. Also, different beam sizes (as illustrated in the example of FIG. 8) may be combined for the same imaged area I, such that in some parts of the imaged area, pixel features overlap, and in other parts pixel features do not overlap.

FIGS. 10A-10D illustrate a further example of the step of analyzing a raster image file. As shown in FIG. 10A, the raster image file contains image areas representing text and image areas representing figures, and a non-image area. The analysis may be done on a tile per tile basis. In FIG. 10A, the raster image is divided into a large number of tiles T. FIG. 10B shows in more detail a number of different tiles T: empty tiles T1, solid tiles T2, line work tiles T3 and screened tiles T4. For example, the size of a tile T may be 512×512 pixels. For example, the control data for solid tiles T2 may indicate that a surface screen has to be applied, whilst the control data for tiles T4 may indicate beam related information on a pixel level.

FIG. 10C illustrates a sample of a map of tiles that contain pixels that contribute to the image (black tiles Tc) and that contain pixels that do not contribute (white tiles Tnc). A path in the form of a stitching line SL through connected white tiles Tnc can split the image data in two parts that can be exposed simultaneously with two separate exposure heads H1, H2, without visible stitching defects. Also, where a strip of white tiles Tnc is determined, said strip extending over the length of the image, the control data may indicate that the strip may be skipped.

FIG. 10D illustrates a sample of a map with tiles that contain pixels that may belong to screened parts of the image (black tiles T4) and tiles that do not belong to a screened part of the image (white tiles). In this case, a tile becomes white (i.e. irrelevant for the detection of screen rulings and angles), if all pixels inside one tile share the same state (contributing to the image or not, such as tiles T1 and T2) or if the number of changes inside this tile in state is lower than 2 (such as tile T3'), when evaluating along each vertical and horizontal line. A screen detection algorithm can now be applied to the relevant tiles only, i.e. tiles such as illustrated tile T3 and illustrated tiles T4. It is advantageous to know the rulings and angles of the screens in the image file, to avoid interferences between the number of parallel laser beams and the screen repetition, and in such an example the control data may indicate the tiles that belong to screened parts of the image and the settings (e.g. the number of beams) to be applied by the imaging device for those tiles.

The processing module 110 analyzes the raster image file and may determine tiles T2, T3, T4 contributing to an image included in the image data, and tiles T1 not contributing to an image included in the image data, as discussed above and illustrated in FIG. 10B. In addition, as illustrated in FIG. 10C, the analyzing processing module 110 may also classify the tiles according to their relevance for the detection of screen rulings and angles.

Figure 11:
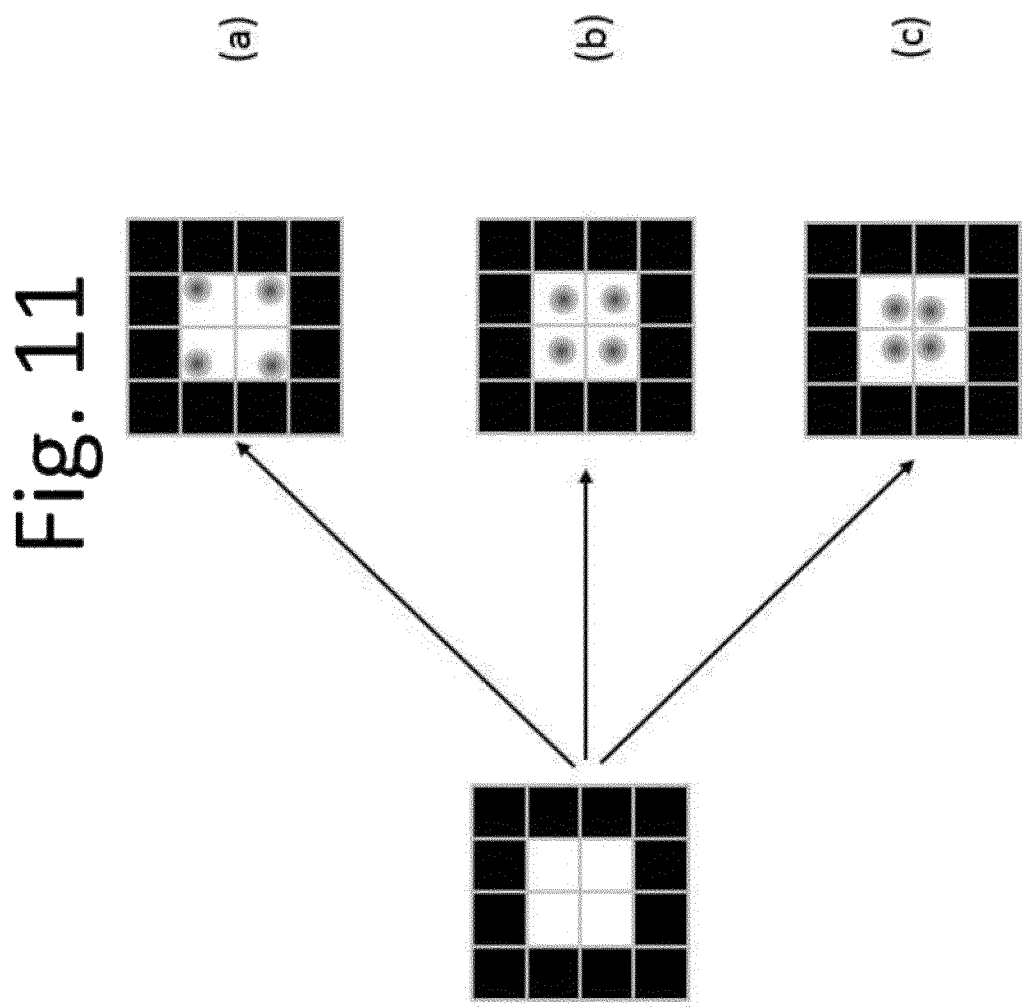
FIG. 11 illustrates a further exemplary embodiment of changing the location of the center of the beam.

FIG. 11 illustrates how the location of the center of the beam away from the center of the pixels of an image feature may be changed. The image feature of the raster image file consists of 4 pixels and in example a) the beam which is smaller than a pixel is located in the center of the pixels. In example b) the beam is shifted to the outer corners of the pixels; this arrangement can be advantageous for very small image features and can generate a surface structure thereon and compensate losses in size during the following process steps. In example c) the beam is shifted towards the center of the image feature and can be used to reduce the size of the image feature. These examples illustrate the extreme cases only and all the other possible combinations of locations are possible. The principle can also be applied to larger image features where the beam is located in the center of the pixels for all pixels except the pixels representing the border off the image feature or being close to the border of the image feature where the beam might be shifted towards the outside or the inside of the image feature. It is clear, that changing the location of the beam may be combined with different beam sizes for different locations. For example one may use a small beam size for the inner pixels of an image feature and a large beam size for the pixels at or close to the border of the image feature or vice versa. In this manner the border of the image feature may be enforced to generate a sharp edge or may be weakened to generate a soft edge which may be used to reduce trail edge voids during printing. In addition to changing the beam size adding or omitting beam exposure at locations at or close to the border of an image feature may be used, whereby by adding exposure spots at or close to the border may enforce the image feature and emitting exposure spots may weaken the image feature. These changes may be performed for all pixels at or close to the border in the same but it is also possible to enhance or weaken the border in a specific direction. Especially when the printing direction is taken into account the edges of an image feature e.g. a bar code can be tailored accordingly. Using a small diameter in combination with additional exposure spots along the border of test can be used to generate very smooth and sharp character.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "processing modules", may be provided through the use of dedicated hardware as well as hardware capable of executing software in association with appropriate software. When provided by a processing module, the functions may be provided by a single dedicated processor, by a single shared processor, or by a plurality of individual processors, some of which may be shared. Moreover, explicit use of the term "processing module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. For example, in FIGS. 2 and 3, the processing module 110 or part thereof could be added in the actual imaging machine (comprising imaging device 120). Alternatively, the processing module 110 may be a separate module outside of the imaging machine, or it may be located partially inside and partially outside the actual imaging machine.

Whilst the principles of the invention have been set out above in connection with specific embodiments, it is to be understood that this description is merely made by way of example and not as a limitation of the scope of protection which is determined by the appended claims.

The invention claimed is:

1. A method to generate a relief structure comprising the steps:
   providing of a relief precursor comprising a substrate layer, at least one photosensitive layer and a mask layer,
   receiving of a raster image file comprising image data for a plurality of pixels,
   analyzing the image data of the raster image file;
   determining control data, and optionally at least one new raster image file, based on the analyzed image data, said control data being data for controlling settings of an imaging device so as to change the physical properties of generated imaged features corresponding with one or more of the plurality of pixels;
   outputting the raster image file and/or the new raster image file, with the control data to an imaging device for imaging a relief precursor;
   imaging the relief precursor using the raster image file and/or the new raster image file, with the control data, such that an image is generated in the mask layer, and exposing the imaged relief precursor to electromagnetic radiation through the imaged mask layer.

2. The method of claim 1, wherein the imaged features correspond with holes or areas with a changed transparency as a result of the imaging.

3. The method according to claim 1, wherein the raster image file and/or the new raster image file used in the imaging step, represents two-dimensional image data.

4. The method according to claim 1, wherein the control data is representative for information about one or more properties of an imaged feature or group of imaged features corresponding with a pixel or a group of pixels and/or information about a feature to be added to an imaged feature or group of imaged features, or about one or more pixels not to be imaged.

5. The method according to claim 4, wherein the information about one or more properties of an imaged feature or group of imaged features comprises any one or more or the following:
- a desired size of an imaged feature or of a group of imaged features corresponding with a pixel or a group of pixels,
- a desired shape of an imaged feature or a group of imaged features corresponding with a pixel or a group of pixels, and
- a desired location of an imaged feature or a group of imaged features corresponding with a pixel or a group of pixels.

6. The method according to claim 1, wherein the control data comprises any one or more of the following:
- an intensity value to be used for generating an imaged feature or a group of imaged features corresponding with a pixel or a group of pixels,
- an on/off signal of a beam of the imaging device for generating an imaged feature or a group of imaged features corresponding with a pixel or a group of pixels,
- a time interval to be used for generating an imaged feature or a group of imaged features corresponding with a pixel or a group of pixels,
- a beam diameter value or beam shape value for controlling a beam of the imaging device,
- a number of passes of an imaging step to be performed by the imaging device,
- an indication of an exposure head of a plurality of exposure heads to be used for generating an imaged feature or a group of imaged features corresponding with a pixel or a group of pixels, and
- a value representative for a beam path of the imaging device, such as a value representative for a location of a spot to be exposed by the beam of the imaging device different from the location of the spot in the starting raster image file, or combinations thereof.

7. The method according to claim 1, wherein the analyzing is performed such that it reveals any one or more of the following:
- pixels contributing to an image included in the image data,
- pixels not contributing to an image included in the image data,
- image areas with pixels contributing to an image included in the image data,
- image areas without any pixel contributing to an image included in the image data,
- image areas with all pixels contributing to an image included in the image data,
- a screen ruling,
- a screen angle,
- for one or more target pixels of said plurality of pixels, a number of neighboring pixels of the target pixel contributing to an image included in the image data,
- for one or more target pixels of said plurality of pixels, a number of neighboring pixels of the target pixel not contributing to an image included in the image data,
- for one or more target pixels of said plurality of pixels, an orientation or position of neighboring pixels of the target pixel contributing to an image included in the image data,
- for one or more target pixels of said plurality of pixels, information on a size of an image area to which the target pixel belongs,
- for one or more target pixels of said plurality of pixels, a structure of an image area, such as a dot, line, character, to which a target pixel belongs, and
- for one or more target pixels of said plurality of pixels, a distance between the target pixel and an edge of the image area,
- or combinations thereof.

8. The method according to claim 1, wherein the analyzing comprises analyzing a plurality of groups of pixels of the raster image file, and wherein the determining comprises determining control data for at least one group of said plurality of groups based on the analyzing.

9. The method according to claim 8, wherein the plurality of groups corresponds with a plurality of tiles of pixels.

10. The method according to claim 8, wherein each group comprises a number of neighboring pixels, wherein the number is at least two.

11. The method according to claim 8, for use with an imaging device with a number of parallel imaging beams, wherein the plurality of groups corresponds with a plurality of strips, wherein the width of a strip corresponds with the number of imaging beams.

12. The method according to claim 8, wherein the analyzing comprises analyzing a pixel of a group, combined with the data of one or more neighboring groups, to determine for every pixel of the plurality of pixels, if the pixel is an imaging pixel and/or if the pixel is part of an image item which is smaller than a predetermined size and/or if the pixel is surrounded by one or more non-imaging pixels.

13. The method according to claim 1, wherein the analyzing comprises deriving image items with predetermined size properties, and wherein the determining comprises generating a new raster image file in which a surface screening pattern is added to the image items with the predetermined size properties and not to the remaining part of the image data.

14. The method according to claim 1, wherein the raster image file is a 1 bit per pixel, BPP file.

15. The method according to claim 1, wherein the control data indicates any one of the following:
- to apply a determined intensity to a pixel of the plurality of pixels;
- for one or more image areas of the image data larger than a predetermined size, to apply a determined intensity to the one or more image areas;
- for one or more isolated pixels of the plurality of pixels, to add an additional imaged feature to the isolated imaged feature corresponding with isolated pixel and/or to apply a predetermined intensity to generate the isolated imaged feature and, if present, the added imaged feature;
- for one or more image areas of the image data smaller than a predetermined size, to add an additional exposure area in or near the one or more image areas; and for one or more isolated pixels of the plurality of pixels, to change the location of the center of the beam away from the center of the pixel.

16. The method according to claim 1, wherein the control data is derived and applied directly in the imaging device without storage of a file.

17. The method according to claim 1, wherein the control data is derived by taking further aspects into account which are related to printing and/or processing conditions.

18. The method according to claim 1, further comprising:
   removing soluble or liquidifiable material, and
   optionally further steps, including drying, light finishing, and/or cutting.

19. A processing module configured to perform the steps of:
   receiving of a raster image file comprising image data for a plurality of pixels,
   analyzing the image data of the raster image file,
   determining control data, and optionally at least one new raster image file, based on the analyzed image data, said control data being data for controlling settings of an imaging device so as to change the physical properties of generated imaged features corresponding with one or more of the plurality of pixels;
   outputting the raster image file and/or the new raster image file, with the control data to an imaging device for imaging a relief precursor.

20. An imaging system comprising the processing module of claim 19 and an imaging device configured for imaging a relief precursor using the raster image file with the control data and/or the new raster image file, such that an image is generated in a mask layer of the relief precursor.

21. A relief structure obtained by the method of claim 1.

* * * * *